United States Patent [19]

Mathes

[11] Patent Number: 4,583,728

[45] Date of Patent: Apr. 22, 1986

[54] AUXILIARY GRIPPER DRIVE

[75] Inventor: Josef Mathes, Offenbach am Main, Fed. Rep. of Germany

[73] Assignee: M.A.N.-Roland Druckmaschinen Aktiengesellschaft, Fed. Rep. of Germany

[21] Appl. No.: 646,694

[22] Filed: Aug. 31, 1984

[30] Foreign Application Priority Data

Sep. 14, 1983 [DE] Fed. Rep. of Germany ....... 3333050

[51] Int. Cl.[4] ........................ B65H 5/10; F16H 25/16

[52] U.S. Cl. .................................... 271/268; 271/277; 414/751; 74/54

[58] Field of Search .................... 271/82, 277, 268, 85; 101/411, DIG. 6; 74/54, 569; 414/225, 226, 744, 751

[56] References Cited

U.S. PATENT DOCUMENTS

| | | | |
|---|---|---|---|
| 3,263,991 | 8/1966 | Singh | 271/82 |
| 4,052,055 | 10/1977 | Jiruse et al. | 271/277 X |

*Primary Examiner*—Bruce H. Stoner, Jr.
*Assistant Examiner*—Matthew C. Graham
*Attorney, Agent, or Firm*—Leydig, Voit & Mayer, Ltd.

[57] ABSTRACT

A cam drive is used to drive the auxiliary gripper on a sheet-fed printing machine having a control cam and an auxiliary cam and associated cam followers. In order to use a minimum amount of pages and eliminate any bending moments from the forces between the cams, the control cam and the auxiliary cam are disposed in a common plane on two parallel shafts and the control lever and associated followers are disposed in the same plane between the cams.

8 Claims, 4 Drawing Figures

AUXILIARY GRIPPER DRIVE

FIELD OF THE INVENTION

The present invention relates generally to a cam actuated auxiliary gripper drive for sheet-fed printing machines having a control cam and follower and an auxiliary cam on which a second cam follower bears, and more particularly concerns a suspension operative between the cam followers so that the cam followers are respectively held in continuous contact with their associated cams.

BACKGROUND OF THE INVENTION

Cam drives are usually used to generate the reciprocating movement of the auxiliary grippers of sheet-fed printing machines. In order that the cam follower secured to the control lever may be kept in continual contact with the control cam, the control lever must be subjected to a force which presses the cam follower against the control cam even when it tends to lift away from the cam due to the mass inertia of the drive and of the auxiliary gripper. This is necessary in order to avoid damage to the transmission, reduce vibration in the machine, and ensure accurate-register sheet transport to the printing machine.

German Pat. No. 677,130 describes an auxiliary gripper control system for sheet-fed printing machines. As shown in this disclosure, two disc cams are secured on the printing cylinder shaft and rotate with the printing cylinder in fixed relationship to one another. A guide roller runs on the first disc cam and is mounted on the control lever, which drives the auxiliary gripper via a pull-rod. The control lever is pivotable about a spindle secured to the frame. A second lever is pivotally mounted on the same spindle and a second guide roller is also secured thereon to run on the second cam. The end of the second lever extends beyond the frame mounting and has an extension in the form of a horn with a compression spring disposed between this horn-shaped extension and the first control lever.

In this arrangement, the lobes of the two cams are so adapted to one another that during the auxiliary gripper movement the spring between the two levers is always at the same tension and performs no working movement. This ensures that the guide rollers bear continually against the cam; but, at the same time there are no unnecessary movements in the drive. A disadvantage of this arrangement, however, is that the two cam discs are situated in two parallel planes transverse to the printing cylinder axis. The control lever and the second lever are thus also in two different planes. Consequently, although no relative movements are provided between the two levers, the prestressing forces applied by the compression spring and the acceleration forces resulting from these movements have to be transmitted via the joint spindle of the two levers. Also, valuable space is taken up by the arrangement of the parallel cams disposed axially one behind the other on the printing cylinder shafts. This is a disadvantage because the printing unit drive gear trains also have to be accommodated in this area.

OBJECTS OF THE INVENTION

The primary aim of the present invention is to provide an extremely space-saving, rigid, and accurate cam actuated auxiliary gripper drive for a sheet-fed printer.

More particularly, by disposing the control cam on one shaft and the auxiliary cam on a second shaft, the control lever may be made in one piece and operated in a single plane transverse to the printing machine shafts.

It is a more detailed object to provide such an arrangement which consists of fewer components, has a lower mass, and therefore produces less vibration and more reliable operation of the printing machine.

SUMMARY OF THE INVENTION

An auxiliary gripper drive for sheet-fed printing machines and the like is provided having a control cam fixed on a shaft for generating the auxiliary gripper movement by way of a control lever which is pivotable on the machine frame and which bears against the control cam via a first cam follower, an auxiliary cam on which a second cam follower bears has a suspension arrangement operative between the cam followers so that the cam followers are respectively held in continuous contact with their associated cams. The control cam and the auxiliary cam are disposed in a common plane on two parallel shafts rotating in a fixed speed ratio to one another and the first cam follower, the second cam follower, the suspension arrangement, and an output to the auxiliary gripper are disposed on the control lever disposed in the same plane between the cams.

In the preferred arrangement, the control lever is made in one piece and the suspension arrangement includes a torsion spring which at one end is secured to the control lever and at the other end is connected to a bearing element disposed rotatably in the control lever and journals the second cam follower on an eccentric. The control cam is secured on the shaft of a take-off drum which rotates at the machine speed, and the auxiliary cam is secured on the shaft of a printing cylinder, the latter having twice the diameter of the take-off drum but rotating at half the machine speed, and the auxiliary cam consists of two identical lobes which merge continuously into one another.

BRIEF DESCRIPTION OF THE DRAWINGS

Other objects and advantages of the invention will be apparent from the following exemplified embodiment described with reference to the attached drawings, wherein.

DETAILED DESCRIPTION OF THE INVENTION

Figure 1:
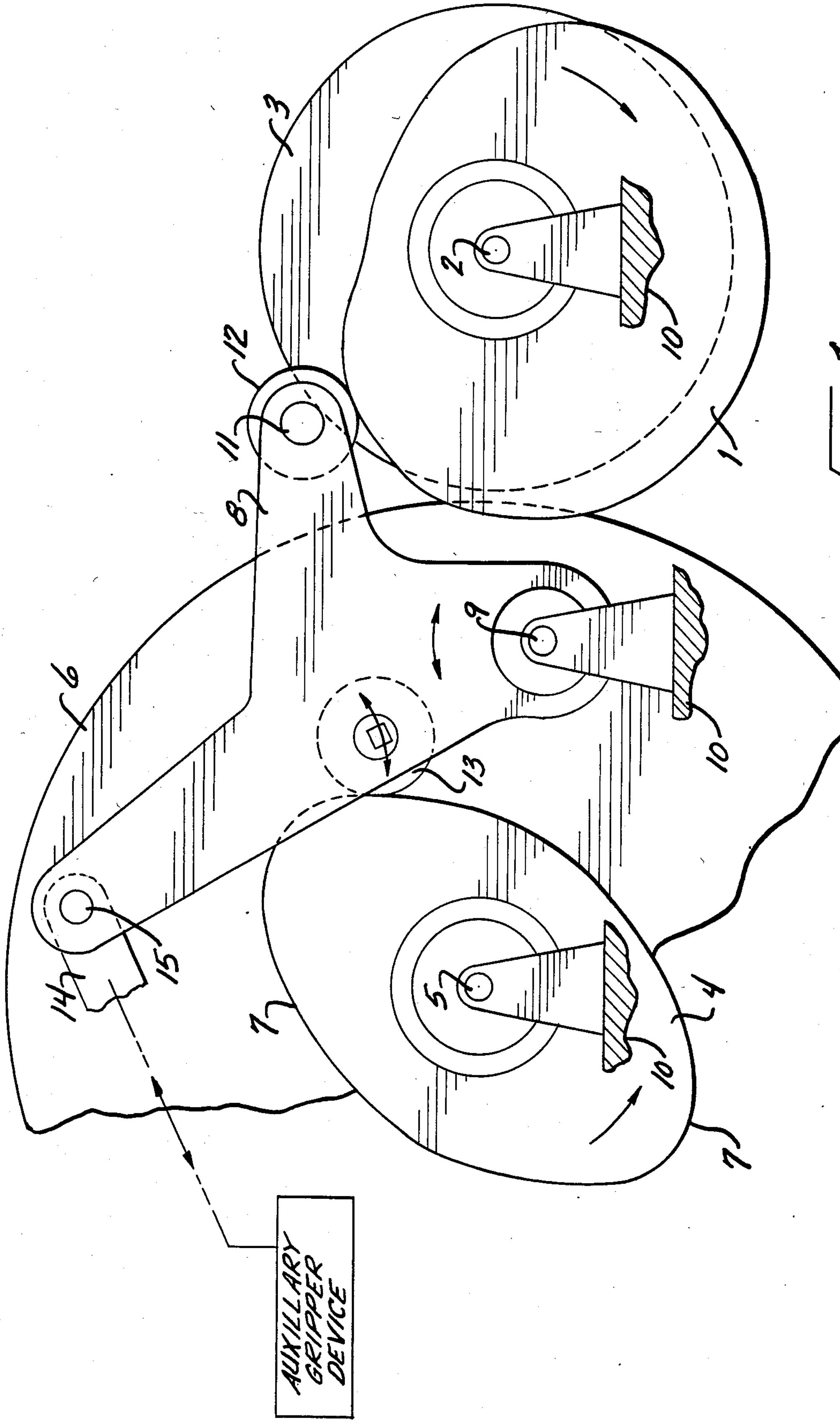
FIG. 1 is a diagrammatic side elevation view of the cam drive of the present invention.

Turning now to the drawings, FIG. 1 is a diagrammatic general view of the complete cam drive for the auxiliary gripper mechanism of the present invention. A control cam 1 is secured on the shaft 2 of the take-off drum 3 of a sheet-fed printing press or the like. Control cam 1 thus rotates at the same speed as drum 3. An auxiliary cam 4 is secured to the shaft 5 of the printing cylinder 6 having a diameter twice that of the drum 3. Cylinder 6 therefore rotates at half the speed of drum 3. Correspondingly, auxiliary cam 4 is provided with two identical lobes 7 which are offset 180° from one another and merge into one another continuously on the cam.

The movements between the control cam 1 and the auxiliary cam 4 are coordinated as a result.

To drive the auxiliary gripper, a control lever 8 is pivotally mounted between control cam 1 and auxiliary cam 4 on a spindle 9 which is secured to the frame in the side upright 10 of the machine, the pivoting movement taking place in the same plane as that in which the control cam 1 and the auxiliary cam 4 are disposed. A first cam follower 12 is mounted on the control lever 8 by means of a spindle 11 and contacts the control cam 1. A second cam follower 13 is also mounted on the control lever 8 by means of a suspension arrangement, which will be described hereinafter. Finally, a connecting link 14 is connected to the control lever 8 by means of a bolt 15 for the purpose of driving the auxiliary gripper (not shown).

The movement cycle of the auxiliary gripper is defined by the control cam 1. The auxiliary cam 4 ensures that the first cam follower 12 always runs accurately on the control cam 1 and its two lobes 7 are constructed accordingly. While control cam 1 performs one revolution, auxiliary cam 4 rotates only through 180°. Thus the lobe 7 on auxiliary cam 4 corresponding to control cam 1 must be contained over half the cam periphery. The size of the auxiliary cam 4 depends only on the transmission ratios at the control lever 8. At higher circumferential speeds, a larger cam contains smaller gradients, while a small cam has larger gradients at lower circumferential speeds. This is less important kinematically than in respect of the manufacturing costs of the cams. On the one hand, material expense increases with size; but with small cams, the limit is determined by the lobe transitions and production techniques.

During machine operation the two cams 1, 4 rotate with their associated shafts 2, 5. The control lever 8 is guided between the cams 1, 4 by means of the cam followers 12, 13 and it pivots about the spindle 9, which is fixed to the sheet-fed printing machine frame. Obviously, the laws of motion of the control cam 1 and of the auxiliary cam 4 must correspond to one another because the control lever 8 is rigid.

The movement cycle of the control lever 8 produces a reciprocating movement at the auxiliary gripper, during which sheets of paper are transferred from a feed table to grippers on the printing cylinder 6. The control cam 1 must therefore ensure that the sheets of paper are accelerated by the auxiliary gripper from standstill to the circumferential speed of the printing cylinder 6. The auxiliary gripper then returns to take the next sheet of paper. During the reversal of the movement high accelerations and inertial forces occur which tend to lift the first cam follower 12 away from the control cam 1 by way of the control lever 8. The second cam follower 13 of the auxiliary cam 4 provides the necessary counteracting force at the control lever 8 to ensure that the latter continues to follow the control cam via the first cam follower 12 and hence hold the auxiliary gripper on the required specific path. Of course, there must be essentially no clearance between the two cams 1, 4 if vibration or irregularities in the auxiliary gripper movement are to be avoided. Since, however, production tolerances are inevitable, a suspension arrangement is provided for the second cam follower 13.

Figure 2:
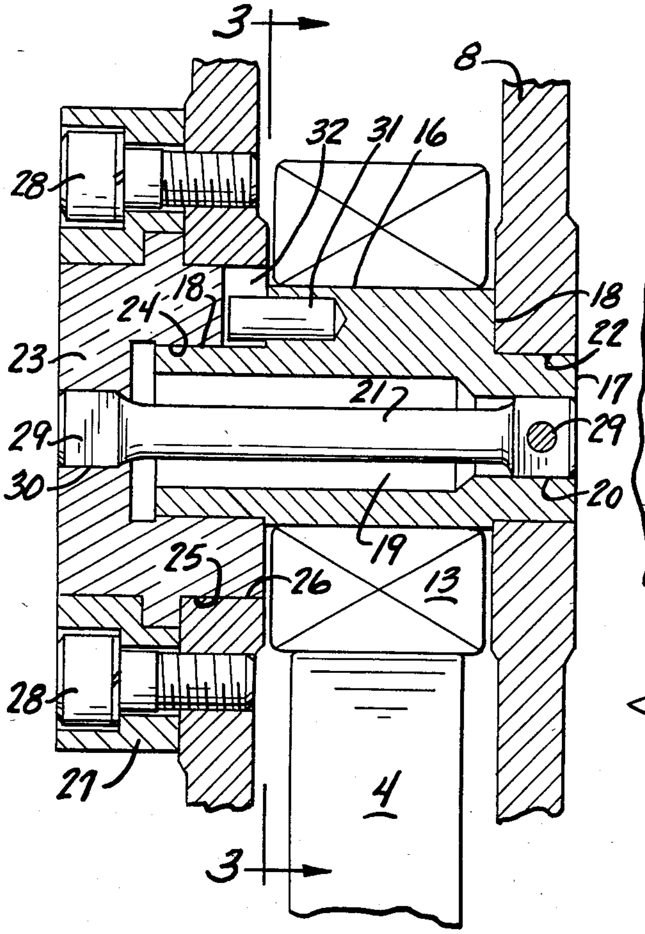
FIG. 2 is an enlarged cross-sectional view through the suspension for the second cam follower.
Figure 3:
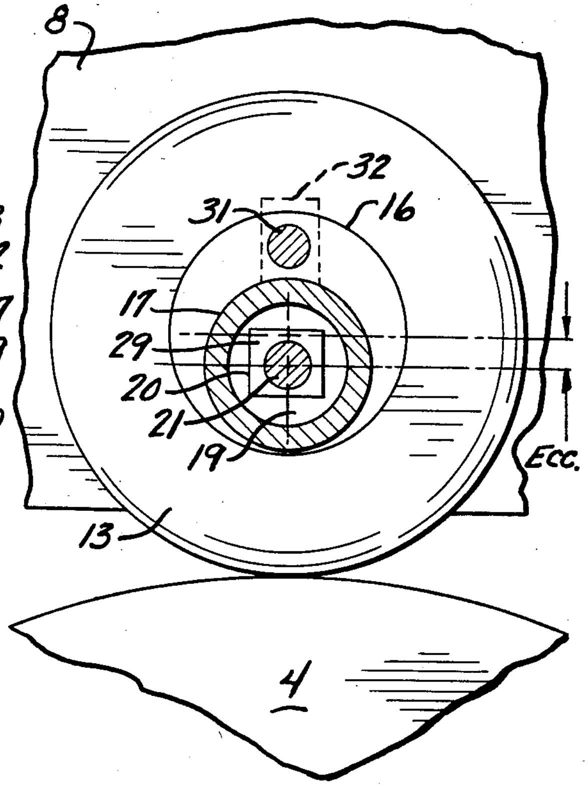
FIG. 3 is a cross-sectional view of FIG. 2 taken along line 3—3; and, FIG. 4 is a side plan view of an alternative embodiment of the suspension for the second cam follower.

FIGS. 2 and 3 show the preferred embodiment of the suspension arrangement for the second cam follower 13 in detail. The second cam follower 13 is mounted on the eccentric 16 on the bearing element 17. The latter has a bore 19 centrally of its two bearing ends 18. At one end of the bearing 17, the bore 19 is square shaped at 20 and one end of a torsion spring 21 is secured in this square portion 20. Bearing element 17 is mounted by the corresponding end 18 in a bore 22 in the control lever 8. The other end of torsion spring 21 is secured in a guide element 23.

At an inner bearing surface 24, the guide element 23 accommodates the second bearing end 18 of element 17. The guide element 23 itself is held in a bore 26 of the control lever 8 by an external guide surface 25 and the guide element 23 is secured against rotation by a clamp ring 27 held by screws 28 on the control lever 8.

The torsion spring 21 has a square portion 29 at each of its ends and the guide element 23 is also provided with a square portion 30 centrally of its concentric guide surfaces 24, 25. Thus, the torsion spring 21 fits by its square ends 29 in the square portion 20 in the bearing element 17 and the square portion 30 in the guide element 23. Since the bearing element 17 is rotatably mounted by means of its bearing ends 18, the torsion spring 21 secures the bearing element 17 against rotation. However, since the second cam follower 13 is journaled on the eccentric 16 of the bearing element 17, a spring action occurs at the torsion spring 21 in the event of any displacement of the second cam follower 13 due to rotation of the bearing element 17 and hence of the eccentric 16. The restoring force of the torsion spring 21 acting on the seoond cam follower 13 and on the auxiliary cam 4 depends on the angular position between the eccentricity (shown at Ecc.) of the eccentric 16 on the bearing element 17 and the direction of application of force at the second cam follower 13 from the auxiliary cam 4.

In accordance with the preferred arrangement, only small amounts of spring travel are possible because the available space is substantially limited by the forces acting within it and by the size of the external cam follower 13. This extremely compact method of construction is of considerable benefit. Since the suspension is used to compensate for any production inaccuracies on the auxiliary cam 4, a spring deflection in the range of less than 1 millimeter is sufficient for tolerance compensation and for the application of a prestressing force.

It will be understood that the movement of the suspension system is dampened by the friction of the bearing ends 18 in the bore 22 and the inner guide surface 24 in the guide element 23. Thus, in the event of any cam proportion inaccuracies, no vibration can be transmitted via the second cam follower 13.

To prevent the second cam follower 13 from losing its function in the event of spring fracture, an additional security is incorporated in the suspension arrangement of the invention. To this end, a securing pin 31 is inserted in the end of the eccentric 16 and engages in a guide slot 32 in the guide element 23. In the event of a spring fracture, the bearing element 17 can then turn only to the extent permitted by the width of the guide slot 32 in relation to the securing pin 31. The guide slot 32, of course, is made of a width such that any production inaccuracies at the auxiliary cam 4 can be compensated, i.e. the necessary small spring deflections are permitted. The torsion spring 21 can also be set to the required prestressing by means of the securing pin 31.

Figure 4:
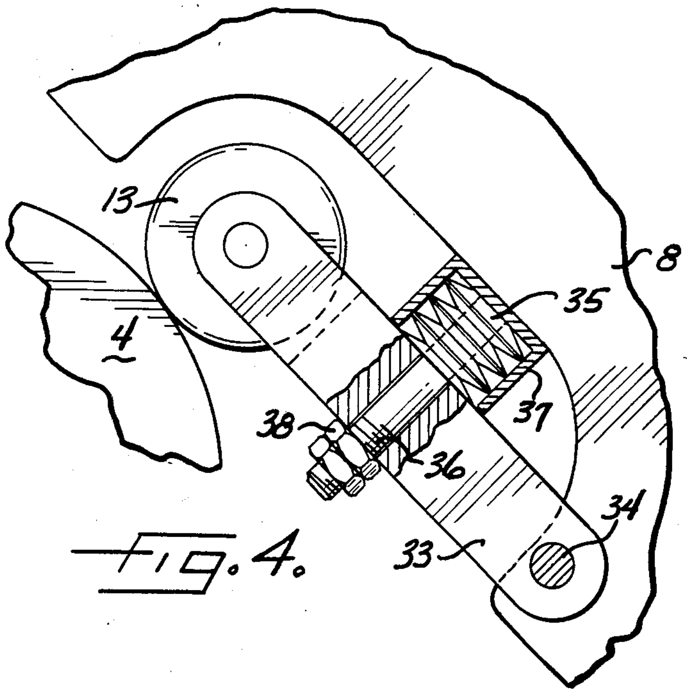

An alternative embodiment of the suspension arrangement for the second cam follower 13 is shown in FIG. 4. In this arrangement, the cam follower 13 is disposed on an auxiliary lever 33 pivotally mounted on the control lever 8 via a bolt 34. A compression spring 35 is disposed between the auxiliary lever 33 and the control lever 8 and is held in place by a screw bolt 36 and a spacer bushing 37. The fixed stops for limiting the movement of the auxiliary lever 33 with respect to the control lever 8 are provided by nuts 38 on the bolt 36 and the spacer bushing 37 in order to maintain the function of the second cam follower 13 in the event of a spring fracture. The friction is generated between the bolt 36 and the auxiliary lever 33, and also in the spring 35.

From the foregoing, it will be apparent from the general arrangement that the cam drive of the present invention is of very compact construction for the auxiliary gripper of a sheet-fed printing machine. It is thus possible for the entire cam drive to be located beneath the machine drive gear train so that very much less space is required axially. In this way it is possible to create space for other drive elements while the transmission of dynamic forces to the auxiliary gripper drive is shifted to shorter distances and more rigid elements. The auxiliary gripper drive is thus optimized generally and adapted to higher speeds. The provision of the cams 1, 4 on two shafts 2, 5 and in one plane also has the advantage that no expensive support structures are now required for mounting the control lever 8. The flow of force is in just one plane and does not have to be deflected from a first plane to a second plane by way of crank levers, which cause bending moments. The bearing system itself is thus simplified, since there are no axial force components resulting from the bending moments and there is no need for bending moments to be taken by way of support elements.

If the auxiliary cam is disposed on a shaft rotating slower than the machine cycle, it must be provided with a corresponding number of identical lobes. The difficulties associated with the manufacture of such a cam automatically result in manufacturing inaccuracies and lack of symmetry between the cam portions. These do not affect the auxiliary gripper drive, however, since the cam follower running on the auxiliary cam has a suspension. The actual drive movement is derived from the control cam, which has just one lobe. If the control lever drive cam is disposed on a shaft rotating at the machine cycle speed, the auxiliary gripper drive movement will always follow the same sequence. The arrangement described not only consists of less components, but has a lower mass and therefore produces less vibration on the printing machine.

In practicing the present invention it is also possible to reverse the design described. The cam having just one lobe can be used as the auxiliary cam and the double cam can be used as the control cam. Other ratios are possible depending upon the cylinder diameter in relation to the sheet cycle. However, allowance must always be made for the speed ratio of the shaft on which one cam is secured, to the sheet cycle, i.e. the number of sheets of paper passing through per shaft revolution, and to the shaft on which the other cam is mounted.

I claim as my invention:

1. An auxiliary gripper drive for sheet-fed printing machines and the like having a machine frame and a control cam fixed on a shaft for generating the auxuiliary gripper movement by way of a control lever which is pivotable on the machine frame and which bears against the control cam via a first cam follower, and having an auxiliary cam against which a second cam follower, disposed on the control lever, bears and a suspension operative between the cam followers so that the cam followers are respectively held in continuous contact with their associated cams, characterized in that the control cam and the auxiliary cam are disposed on two parallel shafts rotating in a fixed ratio to one another and said suspension includes a torsion spring which at one end is secured to the control lever and at the other end is connected to a bearing element disposed rotatably in the control lever and journaling the second cam follower on an eccentric.

2. An arrangement according to claim 1 characterized in that the control lever is made in one piece and the control cam and the auxiliary cam are disposed in the same plane transverse to the machine shafts.

3. An arrangement according to claim 1, characterized in that said bearing element is journaled at one end for limited rotation in a guide plate secured to the control lever.

4. An arrangement according to claim 3, characterized in that a limit pin is carried by said bearing element projecting axially from the eccentric portion thereof and is disposed in a slot having predetermined dimensions formed in said guide plate.

5. An arrangement according to claim 3, characterized in that said torsion spring has square ends and is secured to the control lever through said guide plate and to said bearing element by means of square openings respectively formed therein.

6. An arrangement according to claim 1, characterized in that the control cam is secured on the shaft of a take-off drum which rotates at machine speed, and the auxiliary cam is secured on the shaft of a printing cylinder, the latter having twice the diameter of the take-off drum but rotating at half the machine speed, and the auxiliary cam consists of two identical lobes.

7. An arrangement according to claim 1, characterized in that the auxiliary cam contains at least two identical lobes which merge continuously into one another, the number of lobes corresponding to the ratio of the speed of a second shaft to a first shaft and being an integer.

8. An arrangement according to claim 1, characterized in that the control cam and the auxiliary cam contain at least two identical lobes which merge continuously into one another, the number of lobes corresponding to the number of paper sheets passing through the machine per revolution of the corresponding shaft bearing the cam.

* * * * *